(12) United States Patent
Fletcher et al.

(10) Patent No.: US 8,471,500 B2
(45) Date of Patent: Jun. 25, 2013

(54) ELECTRONIC DEVICE AND METHOD OF ILLUMINATION

(75) Inventors: Bergen Albert Fletcher, Waterloo (CA); Antanas Matthew Broga, Waterloo (CA); William Donald Santo, Waterloo (CA)

(73) Assignee: Research In Motion Limited, Waterloo, ON (CA)

( * ) Notice: Subject to any disclaimer, the term of this patent is extended or adjusted under 35 U.S.C. 154(b) by 372 days.

(21) Appl. No.: 12/827,066

(22) Filed: Jun. 30, 2010

(65) Prior Publication Data

US 2012/0001553 A1    Jan. 5, 2012

(51) Int. Cl.
| G05F 1/00 | (2006.01) |
| H05B 37/02 | (2006.01) |
| H05B 39/04 | (2006.01) |
| H05B 41/36 | (2006.01) |
| H04N 9/73 | (2006.01) |

(52) U.S. Cl.
USPC ............ 315/308; 315/291; 362/632; 362/633

(58) Field of Classification Search
USPC .......... 315/308, 307, 301, 291; 323/234–303; 362/632, 633; 345/590
See application file for complete search history.

(56) References Cited

U.S. PATENT DOCUMENTS

| 5,406,305 | A | 4/1995 | Shimomura et al. | |
| 6,561,668 | B2 * | 5/2003 | Katayama et al. | ............. 362/85 |
| 6,961,044 | B2 | 11/2005 | Woo | |
| 7,352,930 | B2 | 4/2008 | Lowles | |
| 2005/0037815 | A1 | 2/2005 | Besharat et al. | |
| 2005/0047073 | A1 * | 3/2005 | Lo | ................. 361/683 |
| 2005/0073446 | A1 * | 4/2005 | Lazaridis et al. | ............... 341/22 |
| 2006/0087245 | A1 * | 4/2006 | Ng et al. | ........................ 315/149 |
| 2006/0164378 | A1 * | 7/2006 | Phillips et al. | ................ 345/102 |
| 2006/0192749 | A1 * | 8/2006 | Lowles et al. | ................. 345/102 |
| 2007/0002210 | A1 | 1/2007 | Ho et al. | |
| 2007/0097065 | A1 * | 5/2007 | Kreek et al. | .................. 345/102 |
| 2007/0222730 | A1 * | 9/2007 | Kao et al. | ........................ 345/89 |
| 2008/0186294 | A1 * | 8/2008 | Lee et al. | ....................... 345/207 |
| 2009/0109649 | A1 | 4/2009 | Harris | |
| 2012/0050307 | A1 * | 3/2012 | Mahowald et al. | ........... 345/590 |

FOREIGN PATENT DOCUMENTS

| EP | 1696259 A1 | 8/2006 |
| WO | 0041378 A1 | 7/2000 |
| WO | 2005/104081 A1 | 11/2005 |
| WO | 2006/134029 A1 | 12/2006 |

* cited by examiner

*Primary Examiner* — Shawki Ismail
*Assistant Examiner* — Dylan White
(74) *Attorney, Agent, or Firm* — Perry + Currier

(57) ABSTRACT

A method and system are set forth for automatically adjusting keypad luminance based on display content. In one embodiment, the method comprises calculating a lighting level based on ambient light; calculating a luminance level of an image on the display; setting a maximum lighting level to the luminance level of the image on the display; and in the event the calculated lighting level exceeds the maximum lighting level then selecting the maximum lighting level, and in the event the calculated lighting level does not exceed the maximum lighting level then selecting the calculated lighting level.

16 Claims, 5 Drawing Sheets

ELECTRONIC DEVICE AND METHOD OF ILLUMINATION

FIELD

The present application relates generally to an electronic device and more particularly to a method for adjusting illumination of the device.

BACKGROUND

Keypad intensity on an electronic device may be adjusted for different operating environments. For example, in outdoor or sunlight conditions the keypad backlight may be turned off to conserve battery power. In normal indoor or office conditions, the keypad backlight may be turned off. In dim or dark conditions, the keypad backlight may be on to assist readability.

Mobile electronic handheld devices may include a light sensor for sampling ambient light conditions, on the basis of which display and/or keypad illumination or backlighting may be adjusted for readability in different operating environments (e.g. dimly lit environments, normal indoor environments and bright environments), for example as set forth in U.S. Pat. Nos. 6,961,044 and 7,352,930, and United States Patent Publication Nos. 20090109649, 20070097065, 20070002210 and 20050073446.

Improved Light Emitting Diode (LED) and light guide technology can result in keypad backlight intensity that approaches or exceeds display luminance in certain situations. The luminance of a display is dependent on its image content. Thus, a full white screen image may be bright and, as more dark pixels are added to the image, the screen image may appear to dim such that the keypad luminance exceeds display luminance. Keypad luminance in excess of display luminance can distract attention from the display, especially in dark ambient lighting conditions, which can make for less comfortable display viewing/reading.

BRIEF DESCRIPTION OF THE DRAWINGS

An electronic device and method of keypad backlight adjustment will be better understood with reference to the following description and to the figures, in which.

DETAILED DESCRIPTION OF THE EMBODIMENTS

Figure 1:
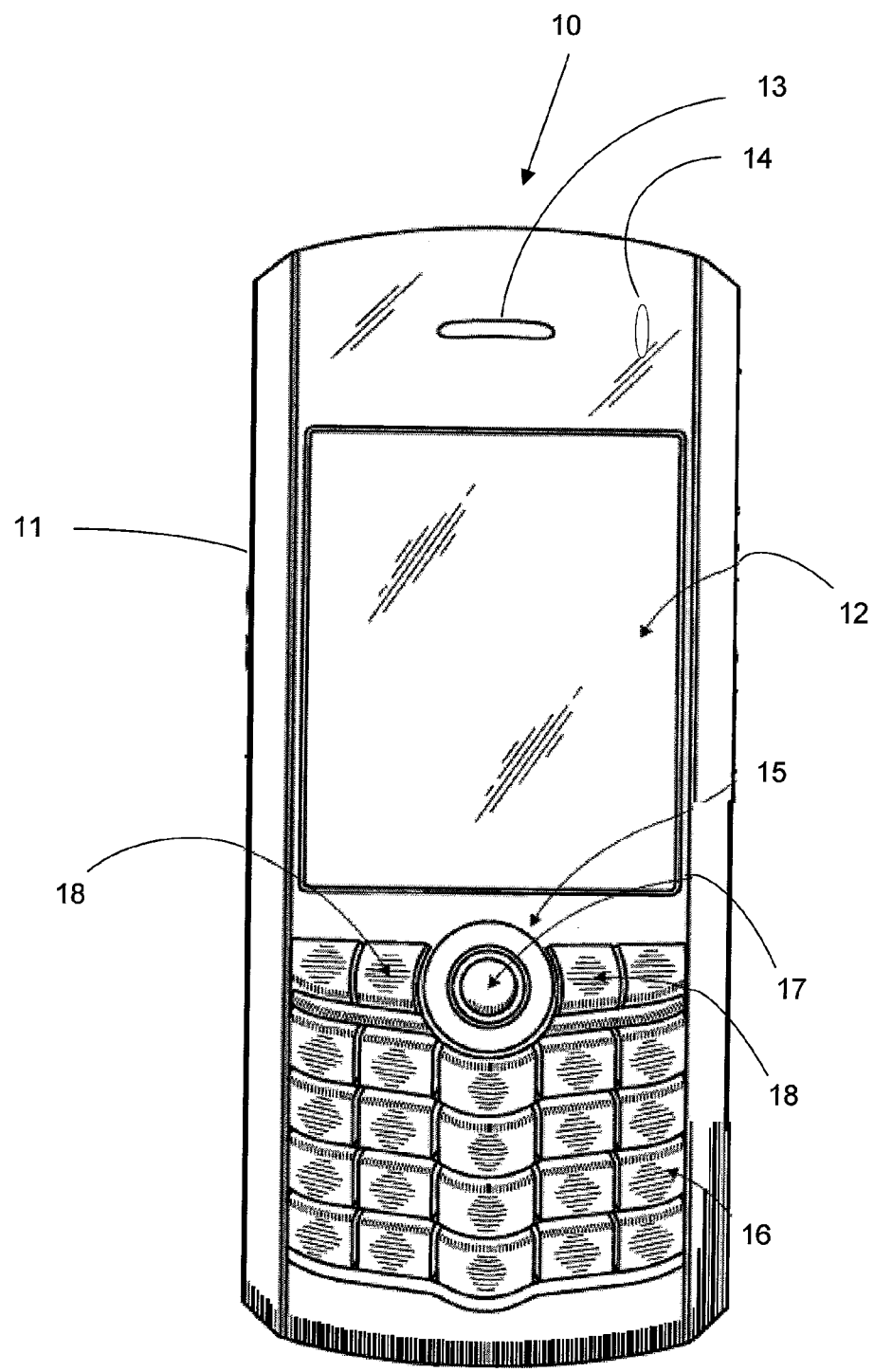
FIG. 1 is a representation of a mobile electronic handheld device in connection with which a method of keypad backlight adjustment is implemented in accordance with one embodiment.

According to one aspect of the specification, there is provided a method for adjusting a source of illumination on an electronic device having a display, comprising: calculating a lighting level for said source of illumination based on ambient light; calculating a luminance level of said display; and if the calculated lighting level for said source of illumination exceeds the calculated luminance level of said display then adjusting the lighting level for said source of illumination to no greater than the calculated luminance level.

The lighting level for said source of illumination may be adjusted to a maximum level that is less than or equal to the calculated luminance level.

Said maximum level may be related to the difference between said calculated luminance level and luminance of an input to said electronic device that is illuminated by said source of illumination.

Said maximum level may be a function of luminance of said input and said difference.

Said maximum level may be a function of delta/luminance, where delta is said difference between said calculated luminance level and luminance of said input to said electronic device.

Said maximum level may be a function of (1−(delta/luminance of said input to said electronic device)), where delta is said difference between said calculated luminance level and luminance of said input to said electronic device.

Said maximum level may be 100 (1−(delta/luminance of said input to said electronic device)), where delta is said difference between said calculated luminance level and luminance of said input to said electronic device.

Calculating said lighting level may comprise comparing ambient light samples to at least one threshold and in response selecting said lighting level.

Calculating said lighting level may comprise taking ambient light samples, calculating a median sample value, comparing the median sample value to a plurality of thresholds and in response selecting said lighting level.

The lighting level may be adjusted from an OFF mode to an ON mode in the event a current light sample is less than a first threshold value and from an ON mode to an OFF mode in the event said current light sample is greater than a second threshold value for a predetermined time period.

The second threshold value may be greater than the first threshold value.

Reducing the intensity of the lighting level for said source of illumination may take place over a longer period of time than increasing the intensity of said lighting level Calculating said lighting level may comprise taking light samples, calculating a median sample value, comparing the median sample value to a plurality of thresholds and in response generating said calculated lighting level.

Calculating the luminance level of said image may comprise reading RGB data for successive pixels of the image on said display, converting said RGB data for each successive pixel to a luma value, adding each said luma value to a histogram and calculating the luminance level from said histogram.

Equal or different weightings may be used for each red, green and blue pixel intensity values. Additionally or alternatively, a histogram can be created for each component colour (red, green, blue—known by the acronym "RGB") of a pixel and a composite colour intensity histogram can be determined for that image.

The lighting level may be adjusted from an OFF mode to an ON mode in the event a current light sample is less than a first threshold value and from an ON mode to an OFF mode in the event said current light sample is greater than a second threshold value for a predetermined time period.

Said first threshold value may be approximately 60 Lux.

Said second threshold value may be approximately 250 Lux and said predetermined time period is approximately 30 seconds.

Said lighting level may be applied to lighting a portion of said electronic device other than said display Said lighting level may be applied to lighting a backlight of a keypad of one of either a desktop computer, cellular telephone, GPS receiver, smart telephone, portable gaming device or laptop computer.

According to a second aspect of the specification, there is provided an apparatus, comprising: a display; a portion other than said display; a source of illumination of said portion; a controller for controlling said source of illumination; and a processor for calculating a lighting level for said source of illumination based on ambient light, calculating a luminance level of an image on said display, and in the event the calculated lighting level for said source of illumination exceeds the calculated luminance level of the image on said display then selecting a maximum lighting level no greater than the calculated luminance level for said controller to control said source of illumination, and in the event the calculated lighting level does not exceed the calculated luminance level of the image on said display then selecting said calculated lighting level for said backlight controller to control said source of illumination.

The apparatus may include a light sensor for taking light samples in response to which said processor calculates a median sample value, compares the median sample value to a plurality of thresholds and in response generates said calculated lighting level.

Said portion of said apparatus may be an input devices, such as a user input device, for example a keypad, track pad, track ball, joystick or any other suitable input device. The source of illumination may be a backlight.

Said backlight may comprise one of either an LED or plurality of LEDs or a lamp located behind said keypad. However, the keypad backlight may be replaced by front, top or side illumination, for example by shining light on the keyboard from an LED, lamp or other source of illumination.

Said lamp may be one of either fluorescent, incandescent or electroluminescent.

Said lighting level may be controlled by adjusting one of either current or voltage or by selectively activating a selected number of lighting sources or by selectively controlling duty cycle of said source of illumination.

Said apparatus may comprise one of a desktop computer, cellular telephone, GPS receiver, smart telephone, portable gaming device or laptop computer.

The processor may set said maximum lighting level by scaling back the keypad backlight level by the difference between the luminance level of the image and the keypad backlighting level.

Figure 2:
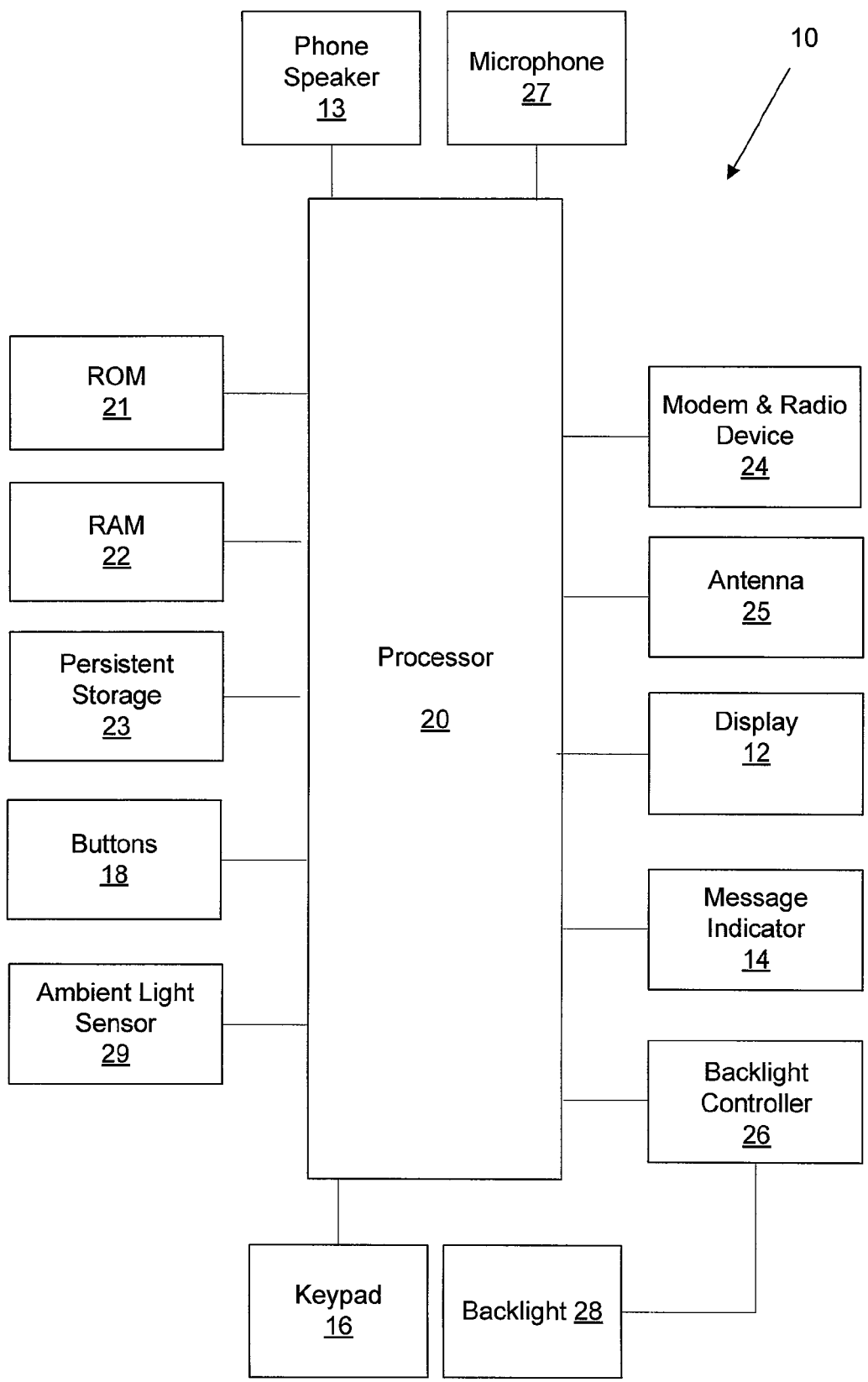
FIG. 2 is a block diagram of certain internal components within the mobile electronic handheld device of FIG. 1.

Referring to FIGS. 1 and 2, a mobile electronic handheld device is indicated by the numeral 10. In the present embodiment, the device 10 is based on the computing environment and functionality of a wireless personal digital assistant. It will be understood, however, that the device 10 is not limited to a wireless personal digital assistant. Other devices are possible, such as desktop computers, cellular telephones, GPS receivers, smart telephones, handheld electronic gaming devices, and laptop computers, to name but a few. Referring to the illustrated embodiment, the device 10 includes a housing 11 that frames a display 12, a speaker 13, message notification indicator 14 and a plurality of input devices 15, such as a keypad 16, trackball 17 and buttons 18. In a typical embodiment, display 12 comprises Liquid Crystal Display (LCD), and may be called an LCD display. This disclosure is not limited to embodiments in which display 12 is an LCD display, however. The message notification indicator 14 may be in the form of a light pipe having two internal branches terminating respectively in a Light Emitting Diode (LED) and an ambient light sensor, as set forth in U.S. Pat. No. 7,352,930, referred to above. The housing 11 may be made from any material or combination of materials that can provide structural integrity to frame the various components, to hold the components in a substantially stable relationship to one another, and can be stored, for example, in a holster (not shown) that includes an attachment for attaching to a user's belt.

Although device 10 is depicted with an input device in the form of a trackball 17, the concept described herein can be adapted to other navigation apparatus, such as a trackwheel or an optical trackpad. Some embodiments of optical trackpads, for example, are responsive to movements like the rotational movements that would rotate trackball 17, and depressions like those that would depress trackball 17.

FIG. 2 shows certain components according to an embodiment of the mobile electronic handheld device 10, including a processor 20 connected to a read-only-memory (ROM) 21 that contains a plurality of applications executable by the processor 20 for enabling the device 10 to perform certain functions including, for example, Personal Identification Number (PIN) message functions, Short Message Service (SMS) message functions, address book and calendaring functions, camera functions, and cellular telephone functions, to name but a few. More particularly, according to an embodiment described in greater detail below a keypad backlight adjustment application may be provided for adjusting luminance of the keypad 16 based on content of an image displayed by the display 12. The processor 20 is also connected to a random access memory unit (RAM) 22 and a persistent storage device 23 to facilitate various non-volatile storage functions of the portable electronic device 10. The processor 20 receives input from one or more of the input devices 15, including keypad 16, trackball 17 and buttons 18.

The processor 20 is connected to a modem and radio device 24 used to connect to wireless networks and transmit and receive voice and data communications through an antenna 25.

The processor 20 outputs to one or more output devices, including display 12, a backlight controller 26 and message indicator 14. A microphone 27 and phone speaker 13 are also connected to the processor 20 for cellular telephone functions.

A typical keypad illumination system comprises a backlight lighting source or backlight 28, such as a series of LEDs or a lamp located behind the keypad 16, and a backlight controller 26 to control activation of the backlight 28 based at least in part on ambient light readings taken by light sensor 29, as discussed in greater detail below. The lamp may be fluorescent, incandescent, electroluminescent or another light source. The intensity of the backlight level may be controlled by the processor 20 by adjusting current or voltage, by selectively activating a selected number of lighting sources (e.g. one, several or all LEDs) or by selectively controlling the activation duty cycle of the activated lighting sources (e.g. a duty cycle anywhere between 0% to 100% may be used).

This disclosure is not limited, however, to embodiments in which the keypad illumination system comprises a backlight lighting source or backlight. Any suitable form of illumination could be used. For example, it is contemplated that keyboard illumination may be achieved by shining light on the keyboard from in front of, above or from the side of the keyboard via, for example, an LED, lamp or other source of illumination.

In addition, the illumination could be illumination of any part of the device other than the display. Typically, it would be illumination of an input device or mechanism but illumination of other parts of the device are possible. Where the illumination is of an input device or mechanism, a keypad is only an example of one possible input device. Examples of other input devices include navigation devices, such as rotatable wheels, rotatable balls, joy sticks, track pads and touchscreens which are separate from the display.

As discussed above, if the luminance of keypad 16 provided by backlight 28 exceeds the luminance of display 12 attention can be distracted from the display, which can make for less comfortable display viewing/reading. Accordingly, as discussed in greater detail below the image content on display 12 may be monitored and the keypad backlight 28 adjusted based on the average pixel content of the displayed image so as to maintain the keypad luminance at a level that is equal or less than that of the display 12, thereby improving comfort/ergonomics as well as reducing power consumption within the device 10.

As indicated above, ROM 21 preferably contains a backlight adjustment application executable by the processor 20 for adjusting luminance of the keypad backlight 28 based at least partly on the content of an image displayed by the display 12. In one embodiment, one or more pixels comprising the displayed image are analyzed for their intensity value(s). Based on the pixel intensity values, a maximum keypad backlight level can be calculated and set for the backlight 28. Thus, when an image is displayed on display 12, the backlight level for keypad 16 can be set so that it does not exceed the luminance of the display 12 based on content of the displayed image. For example, keypad backlight adjustment application can cause backlight controller 26 to generate an appropriate signal, such as a pulse width modulation (PWM) signal or values for a PWM signal that can be used to drive backlight 28 to an appropriate level.

A person of skill in the art will appreciate that an image to be generated on display 12 is initially stored on device 10 as data. As is common in bit-mapped images, a pixel on display 12 can be "lit" in one of a palette of colours, with a palette of intensities, where the colour and intensity values set for that pixel represent one pixel corresponding to the image.

One algorithm provided by the disclosed embodiment, which may be conducted and/or processed by the backlight adjustment application, includes identifying the pixel intensity values of the image and adjusting the keypad backlight intensity based thereon. The intensity values may be determined by utilizing data relating to a distribution of the original pixel values. The distribution may relate to any known or preset statistical or data model. The embodiment utilizes differences in amount of light (flux) which reaches the user's eye for a given image versus the luminance of a full white image. For example, an image having many dark pixels will result in a lower amount of light passing through to the user's eyes than an image having many lighter pixels. A person of skill in the art will appreciate that a full white image will result in the most amount of light possible reaching the user's eye from said display. The reason for lightlevel difference occurs because the liquid crystal in an LCD generally allows more light to pass through lighter pixels and less light to pass through darker pixels. This applies equally to emissive type display technology such as OLED; more light is emitted by pixels which are assigned lighter intensity values whereas less light is emitted by pixels which are assigned darker intensity values.

Figure 3:
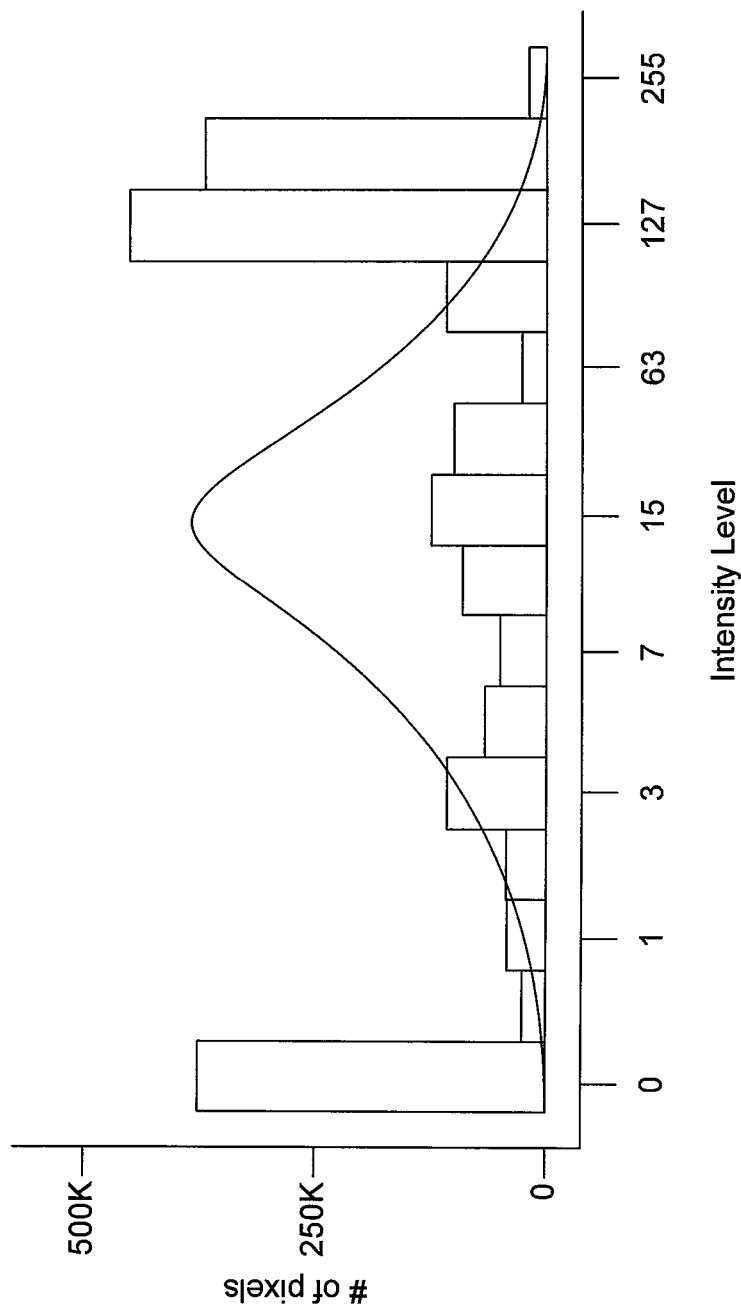
FIG. 3 is an exemplary histogram of pixel intensity values for an image displayed on the mobile electronic handheld device of FIGS. 1 and 2.

Referring to FIG. 3, in determining the intensity of a displayed image, one distribution model for the data is a histogram that may be used to calculate a luminance value for at least a part of the image. Specifically, a histogram may be created representing image intensity where the number of pixels in the image is denoted by the positive y-axis and a intensity value (from dark to bright) is denoted by the positive x-axis. Each bar in the histogram represents the number of pixels in the image illuminated at the intensity level indicated by the associated value on the x-axis. The resulting graph provides an indication of the distribution of the intensity levels in an image from the darker pixels to the lighter pixels. If an image is generally dark (by whatever parameters are set for an embodiment), the histogram for that image would chart a larger number of darker pixels (on the left side of the histogram) compared to the number of lighter pixels. The exemplary histogram of FIG. 3 indicates that there are more bright pixels than there are dark pixels. It will be appreciated that the terms "light" and "dark" are relative terms.

A person of ordinary skill in the art will understand that different values may be provided along the x-axis in a histogram. For example, the intensity scale may be truncated at either end; the scale may be linear or non-linear in sections through the x-axis; also there may be step-wise jumps in intensities at one or more points in the x-axis. Other discontinuities or non-linear progressions may be provided.

The data for a histogram may be stored in a data structure, such as a table in any of the memory storage devices of device 10, such as ROM 21, RAM 22 and/or persistent storage 23. The data may be processed by any application having access thereto. The histogram may track intensity values (luma values) for the pixels of the image, where each of red, green, and blue components pixel may (or may not) be converted to a greyscale or luma equivalent (using any conversion algorithm known to those of skill in the art). Some algorithms may use equal weighting for each red, green and blue pixel intensity values. Other algorithms may use different weighting. Additionally or alternatively, a histogram can be created for each component colour (red, green, blue—known by the acronym "RGB") of a pixel and a composite colour intensity histogram can be determined for that image.

Intensity is based on a numerical value associated with a pixel. For example, a greyscale pixel may have an intensity value ranging from 0 (black) to 255 (pure white) in an eight-bit scale. Each colour component may be plotted on a similar intensity scale. However, it will be appreciated that a "pure" colour (e.g. green) at a given numeric intensity may be brighter (or darker) than a different pure colour (e.g. red) that is generated at the same numeric intensity value. In other words, a green pixel of the same numeric intensity value as a red pixel may have a larger luma value.

Once a histogram (or an equivalent data structure) is created for an image, the luma values can be calculated on at least a portion of pixels comprising the image. The histogram data (or other data) indicates the extent to which the image utilizes the full range of luma values.

Figure 4:
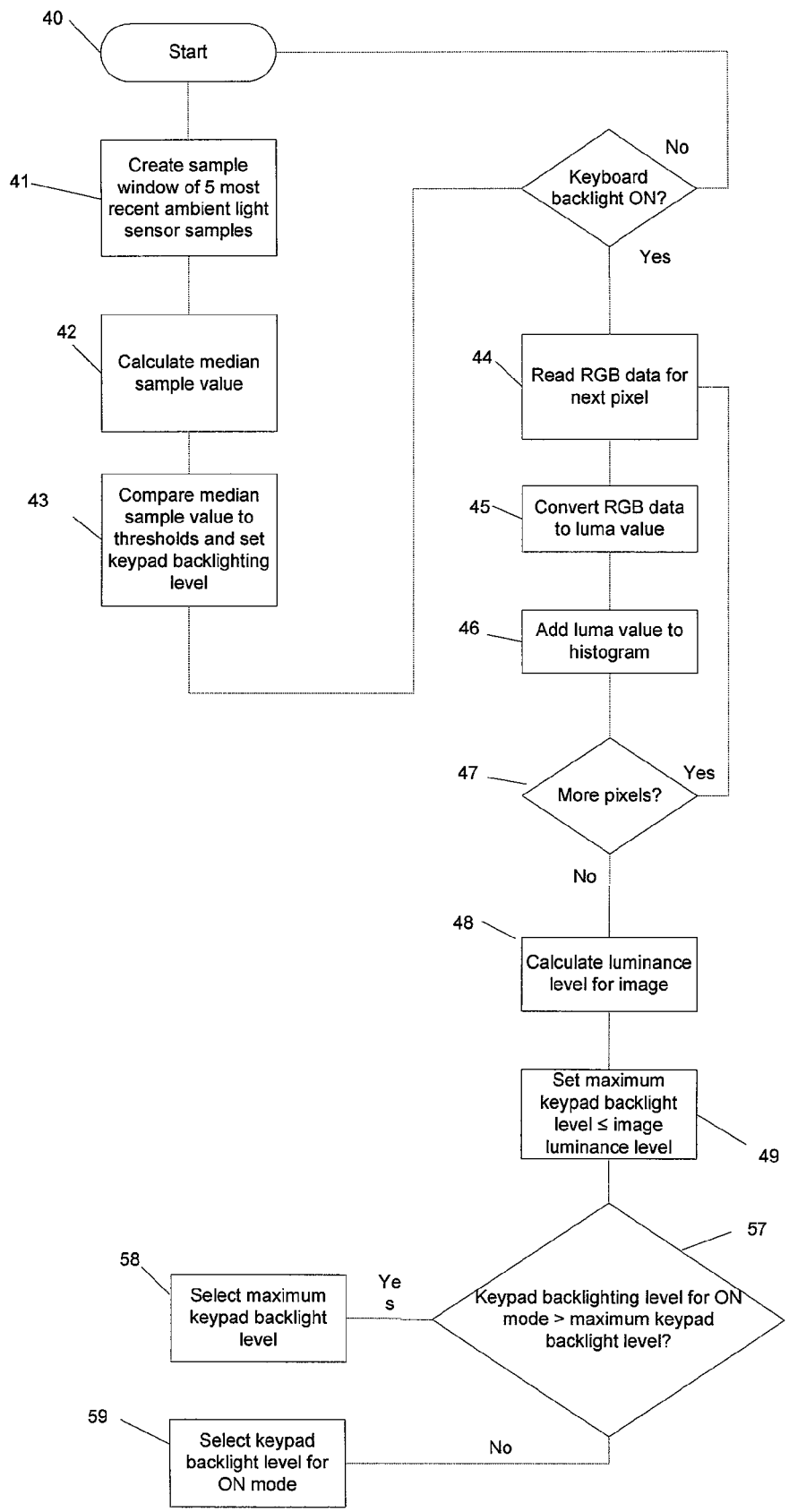
FIG. 4 is a flowchart showing steps in a method of keypad backlight adjustment in the mobile electronic handheld device of FIGS. 1 and 2.

Reference is now made to FIG. 4, showing a flowchart of a method for automatically adjusting keypad luminance based on display content on the device 10 of FIGS. 1 and 2, according to an embodiment.

Each ambient lighting mode has a corresponding luminance/state value as set forth in Table A, where "Lux range" represents the range of ambient lighting intensity (measured in Lux units, and wherein Lux represents the amount of visible light per square meter incident on a surface) in which each mode operates:

TABLE A

| Keypad Backlight Mode | KEYPAD-ON | KEYPAD-OFF |
|---|---|---|
| Lux range for ambient lighting | <60 | >=60 |
| Keypad backlight state | ON | OFF |

Upon starting the algorithm (step 40) when the device 10 is turned on, the backlight mode is normally initialized to an appropriate mode using the ambient lighting sensed by the light sensor 29 at that time. Steps 41-43 result in calculating a keypad backlighting level based on ambient light. Specifically, light sensor samples are taken at set intervals and maintained in a buffer containing the five most recent samples at any given time (step 41). This buffer may be referred to as a sample window because it represents a moving window such that when each new sample is received, the oldest sample in the window is discarded from the buffer. The amount of time between each light sensor sample determines the sampling rate. A typical sampling rate is one sample per 1.2 seconds although in some situations the sampling rate may be increased to 400 ms temporarily for 5 samples to facilitate quick adjustment of the keypad backlight 28, or any other suitable rate. The median sample value is calculated (step 42) by sorting all samples in the sample window and choosing the middle value (i.e. the third sample in the window, according to an exemplary embodiment).

When each sample is received, a new median in the sample window is calculated and compared to various thresholds (step 43) to determine if a backlight adjustment is necessary, according to the thresholds listed in state Table B, where ADC represents Analog to Digital Converter output values:

TABLE B

| median light sensor ADC value | current mode is KEYPAD-ON | current mode is KEYPAD-OFF |
|---|---|---|
| <=16 | n/a | switch to KEYPAD-ON |
| >50 for 30 seconds | switch to KEYPAD-OFF | n/a |

The relationship between ADC threshold values expressed in Table B and light intensity values is as follows: 16 ADO=60 Lux, 50 ADO=250 Lux. In KEYPAD ON mode, the keypad backlight may be turned on. In KEYPAD OFF mode, the keypad backlight may be turned off. The various screen-specific and keyboard-specific modes are determined in response to detected ambient light conditions (e.g., as detected by ambient light sensor 29) and operate to set the keypad backlight 28 to an appropriate operating state, as discussed in greater detail below.

Figure 5:
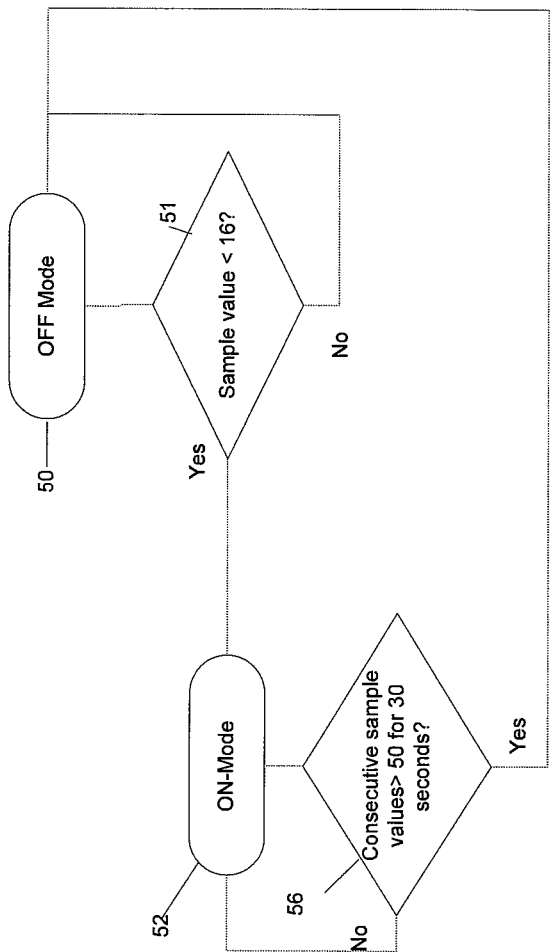
FIG. 5 is a flowchart showing additional steps in the method of keypad backlight adjustment illustrated in FIG. 4.

Turning momentarily to FIG. 5, details of the median sample value comparison and keypad backlighting level calculation (step 43), are shown according to an exemplary embodiment. If the keypad is in OFF mode (step 50) and the sensor 29 generates an ADC value <16 (step 51), then the keypad backlight controller 26 switches to ON-mode (step 52). Exemplary keypad backlight luminance in the ON mode can be 50 cd/m2 at 100% duty cycle and 25 cd/m2 at 50% duty cycle. Otherwise, if the keypad is in OFF mode (step 50) and the sensor 29 generates an ADC value less than 16 (step 51), then the keypad backlight remains in OFF mode (step 50). On the other hand, if the keypad is in ON mode (step 52) and the sensor 29 generates an ADC value indicative of consecutive sample values greater than ADC 50 for 30 seconds (step 56), then the keypad backlight controller 26 switches to OFF mode (step 50). However, if the keypad is in ON mode (step 52) and the sensor 29 does not generate an ADC value indicative of consecutive sample values greater than ADC 50 for 30 seconds (step 56), then the keypad backlight remains in OFF mode (step 52).

Returning to FIG. 4, following completion of the median sample comparison and keypad backlight level mode setting (step 43), discussed in greater detail above with reference to FIG. 5, and in the event that the keyboard backlight has been set to the ON mode, then the backlight adjustment application calculates or otherwise determines pixel intensity value(s), or luminance, for an image in steps 44-48; sets the maximum keypad backlight level in step 49 and adjusts the keypad backlight level in steps 57-59, as discussed in greater detail below.

With reference to steps 44-48, as noted above the luminance level for the image may be calculated on a colour basis, using the intensities of the respective R, G and B values of each pixel in the image. Since the display 12 generates images in colour, in order to provide a luma value for the pixels comprising the image that can be compared against other luma values for other images, it is preferable to convert the colour values to a single pixel intensity (luma) value for each pixel comprising the image. For example, in a given image, a pixel that is green at a given pixel value is more luminous than a pixel that is red at the same pixel value. By converting all colour values for all pixels to a pixel luma value, such differences may be smoothed out, since during the conversion process, the luminosity of different colours is preferably taken into consideration.

Pixel luma values may be calculated (step 45) as the image is read from RAM memory 22 or as the image is being written to the display 12 (step 44). The pixel luma may be derived from a photopic curve based calculation that combines three colour pixels (i.e. red, green and blue) into a single value. This may (or may not) be a greyscale value. The average may be calculated on a running average basis, in order to minimize the processing of large numbers. As an image is being read from memory 22 or as it is being written to the display 12 the value of each pixel may be computed into the running average (step 46), and repeated for all pixels in the image (step 47), as depicted in the histogram of FIG. 3.

For example, the average may be calculated by first summing luma values of all of the pixels in an image and then dividing by the total number of pixels. This computational method introduces large numbers in the calculation method. As an alternative, pixel values may be sequentially added to a running average total. After every pixel value has been added to the total, the average value can be calculated by dividing by the running total number of pixels.

In an exemplary display 12 in device 10, a colour format used is RGB 565, meaning that there are 32 levels of resolution for red in five bits, 64 levels for green in six bits and 32 levels for blue in five bits. One method of obtaining RGB values having a same intensity range from RGB 565 is as follows: First, shift the 5 bit red value to the left by one digit and set the least significant bit (LSB) equal to the most significant bit (MSB). Next, repeat the shift for the 5 bit blue value. At this point, all three colours are in the range of between 0 and 63. Another conversion method (less preferred) is to drop the LSB of the green pixel, in order to normalize all bit values for the red, green, and blue colours. Next, the values for the three colours are converted into a single luma value by a weighted calculation. The weighting of each pixel colour is based on the photopic curve. The human eye does not perceive all wavelengths of light equally: generally green wavelengths are perceived to be more intense than red and blue wavelengths. Therefore, when converting a red-green-blue image to a pixel luma image, the green value in the image is preferably most heavily weighted. A commonly used (NTSC Standard) weighting is provided in the following equation:

$$Luma=PixelIntensity=0.3\times RED+0.59\times GREEN+0.11\times BLUE.$$

From the foregoing, it will be noted that the green value is most heavily weighted with a scaling factor of 0.59, the red value is next most heavily weighted with a scaling factor of 0.3 and the blue value is least heavily weighted with a scaling factor of 0.11. In other embodiments, other scaling factors may be used.

The luma value is then inversely gamma corrected before using the luma value to scale the white screen luminance level. The inverse gamma correction may be applied at the pixel level, or after averaging. For example a corrected luma value can be calculated using the following equation: Corrected_value=max_value*(uncorrected_value/max_value)^(1/panel_gamma), Where the max_value is the maximum possible digital value (255, in the case of using 8 bit integers, or 63 for the 6 bit example used above). Panel_gamma is a known design value for the display, typically 2.2.

Next, the luminance level is calculated for the image by scaling the white screen luminance level by the average luma value of the histogram of pixel data (step 48). The maximum keypad backlight level is then set such that the keypad's luminance is less than or equal to the calculated luminance level far the image en the display (step 49). For example, the maximum keypad backlight level can be scaled barky the difference between the display luminance and the keypad luminanc scaled amount=100(1−(delta/keypad_maximum)); where delta=luminance−keypad luminance).

If the keypad backlight level for the ON mode exceeds the image luminance level far the image being displayed (step 57) then the maximum keypad backlight level (i.e. equal to the luminance of a white screen on the display) is selected (step 58). Otherwise, the normal ON keypad backlight level is selected (step 59). Thus, the backlight level for keypad 16 can be set so that it does not exceed the luminance of the display 12 based on content of the image on display 12.

While the embodiments described herein are directed to particular implementations of a method for automatically adjusting keypad luminance based on display content, it will be understood that modifications and variations to these embodiments are within the scope and sphere of the present application. For example, as indicated above the backlighting luminance adjustment methodology set forth herein is not limit in its application to handheld electronic devices but may advantageously applied to other electronic devices such as desktop computers, cellular telephones, GPS receivers, smart telephones, portable gaming devices, and laptop computers and may, for example, be applied to other lighting systems such as indicator lights. Also, the method for automatically adjusting keypad luminance set forth herein may also be applied in conjunction other existing ambient light sensor algorithms, such as described in U.S. Pat. Nos. 6,961,044 and 7,352,930, and United States Patent Publication Nos. 20090109649, 20070097065, 20070002210 and 20050073446. Also, the keypad backlight 28 may be replaced by front, top or side illumination, for example by shining light on the keyboard from an LED, lamp or other source of illumination. Other modifications and variations may occur to those skilled in the art. All such modifications and variations are believed to be within the sphere and scope of the present application.

The invention claimed is:

1. A method for adjusting a source of illumination on an electronic device having a display and an ambient light sensor, comprising:
    calculating a lighting level for said source of illumination based on ambient tight detected by said ambient light sensor, said lighting level applied to lighting a portion of said electronic device other than said display;
    calculating a luminance level of an image at said display; and
    if the calculated lighting level for said source of illumination exceeds the calculated luminance level of said image at said display then adjusting the lighting level for said source of illumination to no greater than the calculated luminance level.

2. The method of claim 1, wherein the lighting level for said source of illumination is adjusted to a maximum level that is less than or equal to the calculated luminance level.

3. The method of claim 2, wherein said maximum level is related to the difference between said calculated luminance level and luminance of an input to said electronic device that is illuminated by said source of illumination.

4. The method of claim 3, wherein said maximum level is a function of luminance of said input and said difference.

5. The method of claim 4, wherein said maximum level is a function of delta/luminance, where delta is said difference between said calculated luminance level and luminance of said input to said electronic device.

6. The method of claim 4, wherein said maximum level is a function of (1−(delta/luminance of said input to said electronic device)), where delta is said difference between said calculated luminance level and luminance of said input to said electronic device.

7. The method of claim 1, wherein calculating said lighting level comprises comparing ambient light samples to at least one threshold and in response selecting said lighting level.

8. The method of any one of claim 7, wherein calculating said lighting level comprises taking ambient light samples, calculating a median sample value, comparing the median sample value to a plurality of thresholds and in response selecting said lighting level.

9. The method of claim 8, wherein the lighting level is adjusted from an OFF mode to an ON mode in the event a current light sample is less than a first threshold value and from an ON mode to an OFF mode in the event said current light sample is greater than a second threshold value for a predetermined time period.

10. The method of claim 9, wherein the second threshold value is greater than the first threshold value.

11. The method of claim 1, wherein reducing the intensity of the lighting level for said source of illumination takes place over a longer period of time than increasing the intensity of said lighting level.

12. The method of claim 1, wherein calculating the luminance level of said image comprises adding luma values for successive pixels of the image on said display to a running average and calculating the luminance level from said histogram.

13. An apparatus, comprising:
a display;
an ambient light sensor;
a portion other than said display;
a source of illumination of said portion;
a controller for controlling said source of illumination; and
a processor for calculating a lighting level for said source of illumination based on ambient light detected by said ambient light sensor, said lighting level applied to lighting said portion other than said display, calculating a luminance level of an image on said display, and in the event the calculated lighting level for said source of illumination exceeds the calculated luminance level of the image on said display then selecting a maximum lighting level no greater than the calculated luminance level for said controller to control said source of illumination, and in the event the calculated lighting level does not exceed the calculated luminance level of the image on said display then selecting said calculated lighting level for said backlight controller to control said source of illumination.

14. The apparatus of claim 13, wherein said ambient light sensor is for taking light samples in response to which said processor calculates a median sample value, compares the median sample value to a plurality of thresholds and in response generates said calculated lighting level.

15. An electronic device comprising:
a display;
an ambient light sensor:
a portion other than said display;
a source of illumination of said portion;
a controller for controlling said source of illumination; and
processor for calculating a lighting level for said source of illumination based on ambient light detected by said ambient light sensor, said lighting level applied to lighting said portion other than said display, calculating a luminance level of an image on said display, and in the event the calculated lighting level for said source of illumination exceeds the calculated luminance level of the image on said display then selecting a maximum lighting level no greater than the calculated luminance level for said controller to control said source of illumination, and in the event the calculated lighting level does not exceed the calculated luminance level of the image on said display then selecting said calculated lighting level for said backlight controller to control said source of illumination.

16. The electronic device of claim 15, wherein said ambient light sensor is for taking light samples in response to which said processor calculates a median sample value, compares the median sample value to a plurality of thresholds and in response generates said calculated lighting level.

* * * * *

UNITED STATES PATENT AND TRADEMARK OFFICE
CERTIFICATE OF CORRECTION

PATENT NO. : 8,471,500 B2
APPLICATION NO. : 12/827066
DATED : June 25, 2013
INVENTOR(S) : Fletcher et al.

Page 1 of 1

It is certified that error appears in the above-identified patent and that said Letters Patent is hereby corrected as shown below:

In the Claims:

In claim 1, line 18, delete the word "tight" and insert the word --light--

Signed and Sealed this
Tenth Day of September, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,471,500 B2
APPLICATION NO. : 12/827066
DATED : June 25, 2013
INVENTOR(S) : Fletcher et al.

It is certified that error appears in the above-identified patent and that said Letters Patent is hereby corrected as shown below:

In the Claims:

In claim 1, col. 10, line 18, delete the word "tight" and insert the word --light--

This certificate supersedes the Certificate of Correction issued September 10, 2013.

Signed and Sealed this
Fifteenth Day of October, 2013

Teresa Stanek Rea
*Deputy Director of the United States Patent and Trademark Office*